United States Patent [19]
Bederna et al.

[11] Patent Number: 5,880,568
[45] Date of Patent: Mar. 9, 1999

[54] METHOD AND ARRANGEMENT FOR CONTROLLING THE DRIVE UNIT OF A VEHICLE

[75] Inventors: Frank Bederna, Korntal-München; Thomas Zeller, Ditzingen, both of Germany

[73] Assignee: Robert Bosch GmbH, Stuttgart, Germany

[21] Appl. No.: 836,018

[22] PCT Filed: Oct. 7, 1995

[86] PCT No.: PCT/DE95/01376

§ 371 Date: Apr. 29, 1997

§ 102(e) Date: Apr. 29, 1997

[87] PCT Pub. No.: WO96/13657

PCT Pub. Date: May 9, 1996

[30] Foreign Application Priority Data

Oct. 29, 1994 [DE] Germany .................... 44 38 714.8

[51] Int. Cl.[6] .................................................. B60K 31/04
[52] U.S. Cl. .................. 318/563; 318/568.1; 318/139; 364/424.04; 364/426.04
[58] Field of Search ............................. 318/560–696, 318/138, 139; 73/117.3, 118, 116, 119 R; 303/92, 20; 324/158 MG; 340/660, 661, 664, 438, 439; 364/186, 551.01, 483, 550, 426.015, 424.04, 424.034, 424.05, 431.01; 180/170

[56] References Cited

U.S. PATENT DOCUMENTS

| | | | |
|---|---|---|---|
| 4,527,424 | 7/1985 | Takahashi | 73/119 A |
| 4,534,214 | 8/1985 | Takahashi | 73/118 |
| 4,546,647 | 10/1985 | Takahashi | 73/118 |
| 4,587,615 | 5/1986 | Takahashi | 364/431.01 |
| 4,599,696 | 7/1986 | Takahashi | 364/431.11 |
| 4,646,008 | 2/1987 | Takahashi | 324/158 MG |
| 4,884,204 | 11/1989 | Seibt et al. | 364/431.03 |
| 4,896,276 | 1/1990 | Saglimbeni et al. | 364/550 |
| 5,182,755 | 1/1993 | Sekiguchi et al. | 371/16.3 |
| 5,372,410 | 12/1994 | Miller et al. | 303/92 |
| 5,552,985 | 9/1996 | Hori | 364/426.04 |
| 5,590,040 | 12/1996 | Abe et al. | 364/424.04 |
| 5,648,759 | 7/1997 | Miller et al. | 340/660 |

FOREIGN PATENT DOCUMENTS

| | | |
|---|---|---|
| 0121937 | 10/1984 | European Pat. Off. . |
| 0212682 | 3/1987 | European Pat. Off. . |
| 0231155 | 8/1987 | European Pat. Off. . |
| 3726489 | 2/1989 | Germany . |
| 4219457 | 12/1993 | Germany . |
| 4302483 | 8/1994 | Germany . |

*Primary Examiner*—Paul Ip
*Attorney, Agent, or Firm*—Walter Ottesen

[57] ABSTRACT

A method and an arrangement for controlling the drive power of a motor vehicle is suggested. Only one computing element (microcomputer) is provided for performing control functions and monitoring functions. At least two mutually independent levels are fixed in the microcomputer. A first level performs the control functions and a second level performs the monitoring functions.

8 Claims, 3 Drawing Sheets

METHOD AND ARRANGEMENT FOR CONTROLLING THE DRIVE UNIT OF A VEHICLE

FIELD OF THE INVENTION

The invention relates to a method and an arrangement for controlling the drive unit of a vehicle.

BACKGROUND OF THE INVENTION

A control method of this kind and a control arrangement of this kind are disclosed in German patent publication 4,220,247. There, a first microprocessor or computer is provided to control the drive unit. In the preferred embodiment, the microprocessor or computer executes computations for metering fuel, adjusting ignition time point and for controlling the air supply to the engine in dependence upon the command of the driver. Most importantly, this computing element has the possibility to increase the power of the engine by computing the air supply. For this reason, a second computing element is provided to monitor the correct function of this computing element. The second computing element monitors the operation of the first computing element and, in the case of a fault, switches off the power control by the first computing element or initiates an emergency operation. In the preferred embodiment, the monitoring of the operation of the first computing element is performed by a comparison of the driver command to the position of the element influencing the air supply.

Even though this known system guarantees a reliable operation of a drive unit with high availability, it is associated with high complexity and therefore high cost because of the second computing element so that this solution can be unsatisfactory for other embodiments.

SUMMARY OF THE INVENTION

It is therefore an object of the invention to provide a method and an arrangement for controlling the drive unit of a vehicle which requires a significant lesser complexity while providing high availability and operational reliability.

This is achieved in that only one computing element (conventional microprocessor or microcomputer) is provided which performs the functions or computations for power control as well as the monitoring thereof. Operational reliability and availability are ensured in that two levels are provided in the single computing element. These levels are independent of each other at least outside of a fault situation. In a first level, the functions of the power control are computed and, in the second level (if required, in combination with a watchdog), these functions and therefore the operability of the computing element itself are monitored.

A control system for a vehicle having a microcomputer and a monitoring module is disclosed in U.S. Pat. No. 5,436,837. The monitoring module is preferably configured as a gate-array which executes a sequence control of the microcomputer. For this purpose, the microcomputer and the monitoring module both process signal values in the context of a query/reply interplay. The monitoring module determines the correct or defective operation of the microcomputer from a comparison of the results of this processing. With this sequence control by means of a simply configured monitoring device, the complexity for such a control system is considerably reduced; however, a complete monitoring of the functions computed by the microcomputer cannot take place.

The procedure of the invention leads to a control unit for controlling the drive unit of a motor vehicle which requires a significantly lesser complexity and therefore is of greater cost effectiveness. Especially the number of components is reduced so that a lower probability of disablement and also a lower susceptibility to fault of the system is obtained.

It is especially advantageous that two channels are provided within the computing element which are mutually not influenced as to their function, at least outside of a defect. These two channels are provided by the provision of at least two levels, namely, a function level and a monitoring level. In this way, an operational reliability and availability comparable to a control system having two computing units is achieved.

It is of a special significance that the control system, which comprises only one computing element, can be adapted with greater ease to different peripheral conditions because the individual (program) modules can be treated separately from each other.

Special advantages result from a third level which executes a sequence control of the second level. This monitoring considerably increases operational reliability and availability. It is advantageous to use an active watchdog which executes the sequence control as a query/reply interplay.

BRIEF DESCRIPTION OF THE DRAWINGS

The invention will be explained in greater detail with reference to the embodiments shown in the drawings.

DESCRIPTION OF THE PREFERRED EMBODIMENTS OF THE INVENTION

Figure 1:
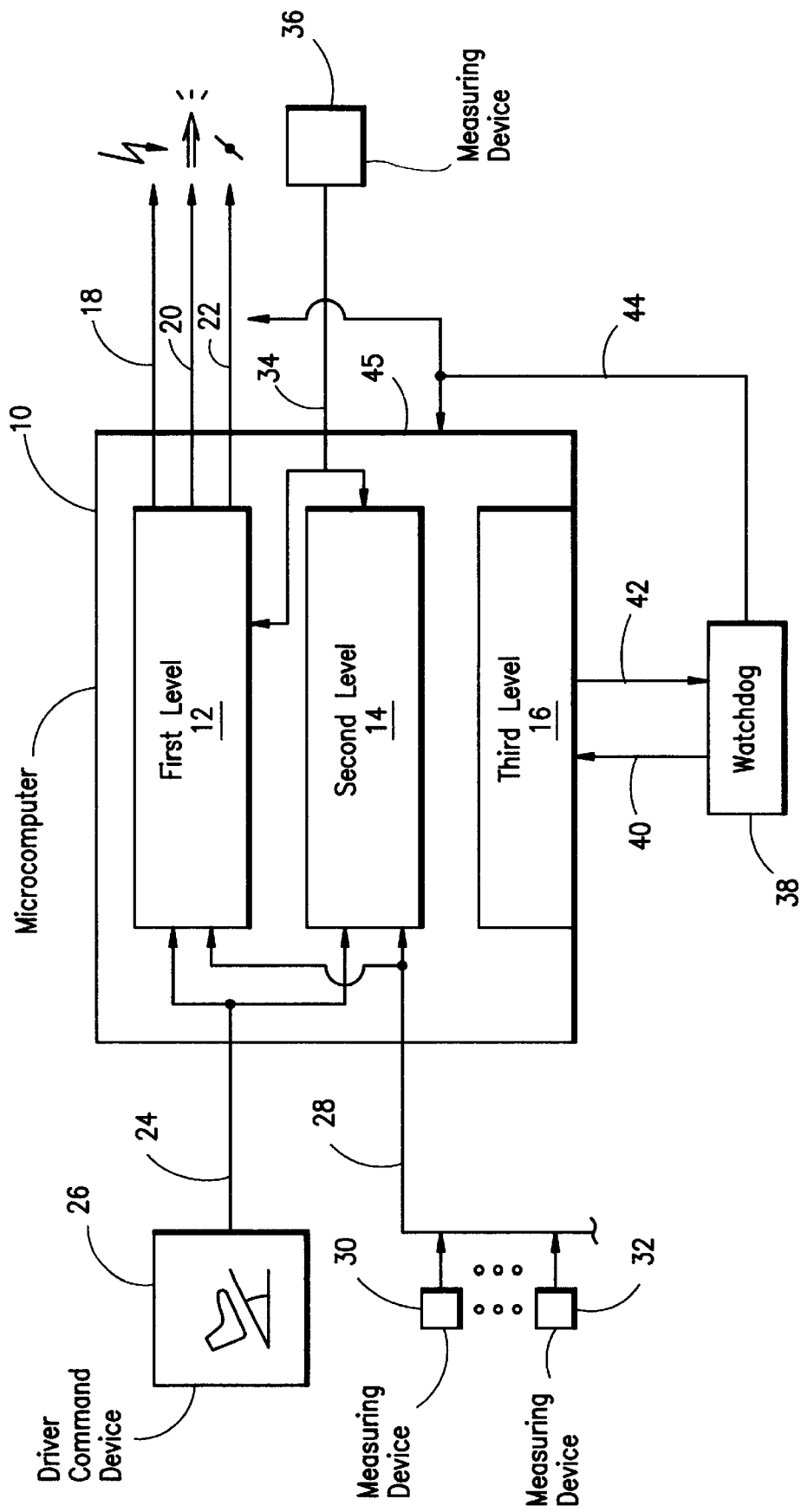
FIG. 1 shows an overview block diagram of the control system of the invention; whereas, in FIG. 2, a detailed illustration is shown in the form of a block circuit diagram. Finally.

In FIG. 1, an overview block circuit diagram of a control system is shown for the power of an internal combustion engine of a vehicle. Here, 10 identifies a conventional computing element such as a microcomputer. The microcomputer 10 is organized in three levels. A first level 12 executes the calculations for carrying out the power control; whereas, a second level 14 monitors this function level 12. A third level 16 defines a control level which controls the monitoring level 14 and therefore the microcomputer 10 itself on the basis of a sequence control. The microcomputer 10 includes output lines as follows: an output line 18 for controlling the ignition time point, an output line 20 for controlling the metering of fuel and an output line 22 for controlling the air supply, preferably, via an electrically actuable throttle flap. The output lines 18 through 22 lead away from function level 12 and are driven thereby. A line 24 from a driver command device 26 is provided as an input line. The driver command measuring device 26 preferably is a position detecting element for the position of an operator-control element actuable by the driver such as an accelerator pedal. The line 24 leads to the function level 12 and the monitoring level 14. A further input line is defined by the line 28 which connects the function level and the monitoring level of the microcomputer 10 to the measuring devices 30 to 32. The measuring devices 30 to 32 detect operating variables of the internal combustion engine and/or of the motor vehicle. In a preferred embodiment, the input line 28 defines a bus system such as CAN. A further input line is the line 34 which leads to the function level and the monitoring level and which connects the microcomputer to a measuring device 36 for detecting the air supply, preferably, the position of the electrically actuable throttle flap. In addition, a watchdog 38 is provided which communicates via the lines 40 and 42 with the microcomputer 10, there with the control level 16. An output line 44 of the watchdog leads to the reset input 45 of the microcomputer 10 and, for example, to the output stages for the adjustment of the air supply or the metering of fuel to bring the drive unit to standstill in the case of a fault.

In the function level, and in the preferred embodiment, the quantity of fuel to be metered and the ignition time point to be adjusted are determined on the basis of the engine rpm and engine load as known and outputted. The measured values of the engine rpm and engine load are supplied via the bus system 28 from predetermined and stored characteristic fields. Furthermore, a desired value for the air supply is determined on the basis of the driver command supplied via the line 24. In the preferred embodiment, this desired value is for the position of the throttle flap of the engine. This desired value is compared to the actual value supplied by the measuring device 36 via the line 34. The actual value is preferably the actual position of the throttle flap. With this comparison, this desired value is controlled in the context of a control loop by a digital controller (in the case of the control of the throttle flap, a position controller). As known from the state of the art, the function level 12 assumes the control of the power of the internal combustion engine in dependence upon the driver command pregiven by the driver via the position of the operator-controlled element.

In the preferred embodiment of a system wherein the air supply is influenced electrically, fault conditions can be detected directly by comparing the output variable of the system (air supply, throttle flap angle) to the input variable (driver command). The air supply or the throttle flap angle should not be greater than the driver input in operating states in which the driver command exclusively controls the power of the engine. This monitoring measure known per se takes place in the second level, the monitoring level. For this purpose, the driver command is supplied via line 24 and the output variable is supplied via the line 34. If a fault condition is detected, this leads in the function level to an emergency operation and/or to power limiting via the third level and the watchdog. The control level includes measures for testing the memory elements as well as a control sequence which, in coordination with the watchdog, checks the correct execution of the software functions of the second level, and in the case of a fault, as required resets the computer, interrupts the line control and/or limits the power of the engine.

In addition to the illustrated embodiment, the invention can be applied in an advantageous manner everywhere where fault conditions can be derived from a comparison of the input and output quantities of the control system.

Figure 2:
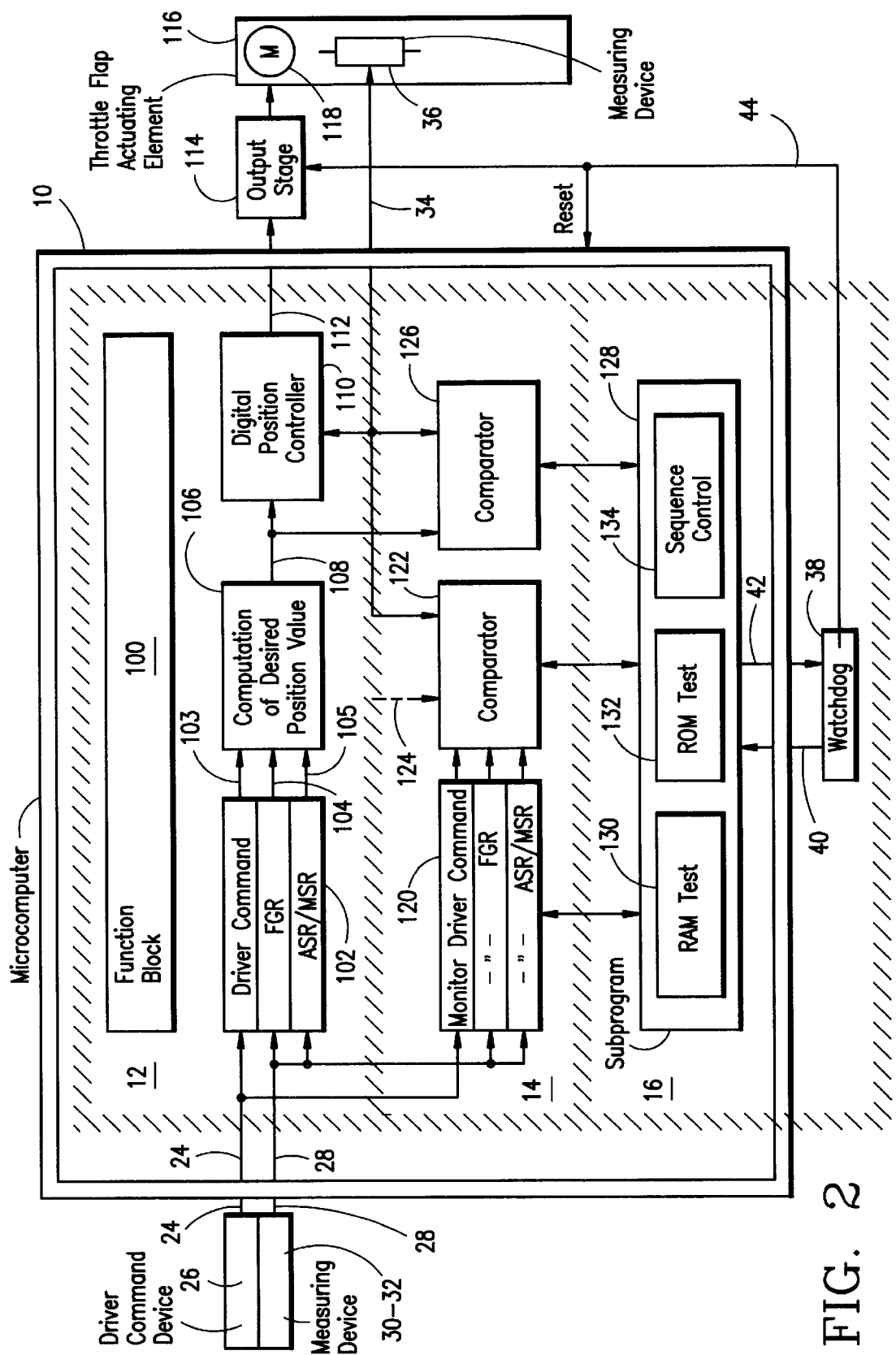

FIG. 2 shows a more detailed illustration of the three levels of the microcomputer in the context of the preferred embodiment of the electrical control of a throttle flap of an internal combustion engine. The elements which are described and shown already with respect to FIG. 1 are not explained in greater detail.

In the first level, function level 12, a function block 100 includes the functions which determine the metering of fuel and the adjustment of the ignition time point. In a function block 102, the signals supplied via lines 24 and 28 are read in and evaluated. In this way, the following are read in and evaluated: the position value of the accelerator pedal, which is supplied via the line 24; signals for controlling the road speed (signals from the operator-controlled element, brake switch, et cetera); and, interventions of other functions such as drive slip control (ASR), an engine drag torque control (MSR), the transmission control, et cetera, which supply input values for the adjustment of the throttle flap via the bus system 28. Furthermore, measurement variables such as engine rpm, engine temperature, et cetera, are read in. The evaluated signals are transmitted via the lines 103, 104 and 105 to the block 106, wherein the desired position value for the throttle flap is computed from the supplied signals. The desired position value is transmitted via the output line 108 to the digital position controller 110. In the digital position controller 110, the desired value is compared to the actual value of the throttle flap supplied via the line 34 and a drive signal for the electric motor, which actuates the throttle flap, is formed. This drive signal is supplied via the line 112 and the output stage circuit 114 to the throttle flap actuating element 116. Actuating element 116 comprises a position motor 118, which actuates the throttle flap (not shown), and at least one position transducer 36 for the throttle flap. Correspondingly, a block 120 is provided in the second level (the monitoring level 14) in which the driver command, the interventions from the road speed controller or from other functions are checked. It is then determined whether the accelerator pedal has been released (via a threshold comparison), that is, whether the driver wants idle power, whether the road speed controller and/or the other interventions are active or not. These signals are transmitted via lines 121, 123 and 125, respectively, to the block 122 wherein the driver command is compared to the throttle flap position supplied via the line 34 and a check is made as to whether there is correspondence. Alternatively, for monitoring (in lieu of the throttle flap position) an engine load signal can be applied for the comparison to the driver command as indicated by the broken line (arrow 124). A block 126 is provided parallel to block 122. In block 126, the position of the throttle flap is monitored in that the throttle flap desired value is compared to the throttle flap actual value. If a deviation persists, then it can be assumed that there is a defective function of the controller component 110 or the position element 116. The individual function elements of the second level are connected to the control level 16. There, a monitoring block 128 is shown which includes the elements: RAM test 130, ROM test 132 and sequence control 134. As described below, via these elements and in cooperative relationship with the active watchdog 38, the correct execution of the subprogram of the second level is checked. If a fault is determined here, the watchdog 38 resets the computing element 10 via the line 44 and/or switches off the output stage 114.

In a preferred embodiment, and for monitoring the driver command, the driver command is detected via two measuring devices independently of each other. One measuring device is defined as a safety measuring device and is compared to a pregiven threshold value in block 120 for monitoring the driver command. If the driver command value drops below the threshold value, then it can be assumed that there is an idle command of the driver. For monitoring the road speed controller, the provision is made as in the state of the art initially referred to herein that, for a brake actuation, the road speed controller is deactivated when there is a drop below a minimum speed limit or when there is an actuation of the off-switch or, for an actuation of the on-switch, the road speed controller is activated. This is transmitted to block 122 because, in this operating state, the monitoring undertaken in block 122 cannot be carried out or is carried out in modified form. Correspondingly, in block 120, the ASR/MSR functions are determined based on corresponding data as to whether these functions are active or inactive. A corresponding message is supplied to block 122 because, also in this case, monitoring cannot be carried out or is only carried out in a modified form.

To ensure the correct operation of the microcomputer 10, the correct processing of the subprograms, provided in the second level 14 (and, as required, supplemented in the third level), is monitored by the third level 16 (the control level) by means of a sequence control 134. For this purpose, a watchdog 38 is provided which communicates via the lines 40 and 42 by means of the subprogram 128 provided in the level 16 of the computer 10. The level 16 includes subprograms such as: a test program 130 for the write/read memory (wherein, in a preferred embodiment, predetermined memory and reading actions are executed and the correct execution of these actions is checked); a test program 132 for the read memory (wherein, in a preferred embodiment, pregiven read operations are executed and checked); and, the subsequently described sequence control 134. For the sequence control, the watchdog 38 transmits a query via the line 40 to the microcomputer. The query is determined by a random number generator which, in the preferred embodiment, comprises a pulse sequence having pulse-widths selected by the random number generator. The sequence control program 134 evaluates this query, that is, this pulse signal, and determines the subprograms or the programs which are applied to reply to the query posed by the watchdog 38. A preferred embodiment provides that all program modules (120, 122, 126, 130 and 132) or parts thereof are applied for monitoring. When there is a call or entry into the selected program modules or subprograms, a first counter of the sequence control is incremented or decremented by a pregiven amount and, when leaving this selected subprogram, a second counter is incremented or decremented by a different amount. When all program modules or subprograms, which are selected by the sequence control, have been processed, then a counter reading of the first counter and a counter reading of the second counter results which is converted by the sequence control 134 into a pulse signal having pulse lengths corresponding to the counter readings. This pulse signal is transmitted via the line 42 to the watchdog 38 which compares this reply of the microcomputer 10 to its query presented via the line 40. If the watchdog 38 detects deviations, then the watchdog 38 proceeds from a fault condition of the microcomputer 10 and resets the microcomputer via the line 44 and switches off, as required, the output stage 114 or limits the power of the internal combustion engine. In a preferred embodiment, the first counter is always incremented by one and the second counter is always incremented by two.

For the sequence control, any desired number of query/reply pairs are conceivable. In a preferred embodiment, the complexity in the watchdog 38 can be reduced to a minimum when only two query/reply pairs are provided. It has been shown that limiting to two pairs does not bring with it any shortcoming with respect to operational reliability of the system.

FIG. 2 shows a preferred embodiment of the invention. Of course, the invention can also be advantageously utilized when the power is controlled via an electric path utilizing only a road speed controller (FGR), a combination of FGR and ASR and/or MSR, with or without a transmission intervention or when the adjustment of the throttle flap wanted by the driver is combined with one or more of these functions.

Figure 3:
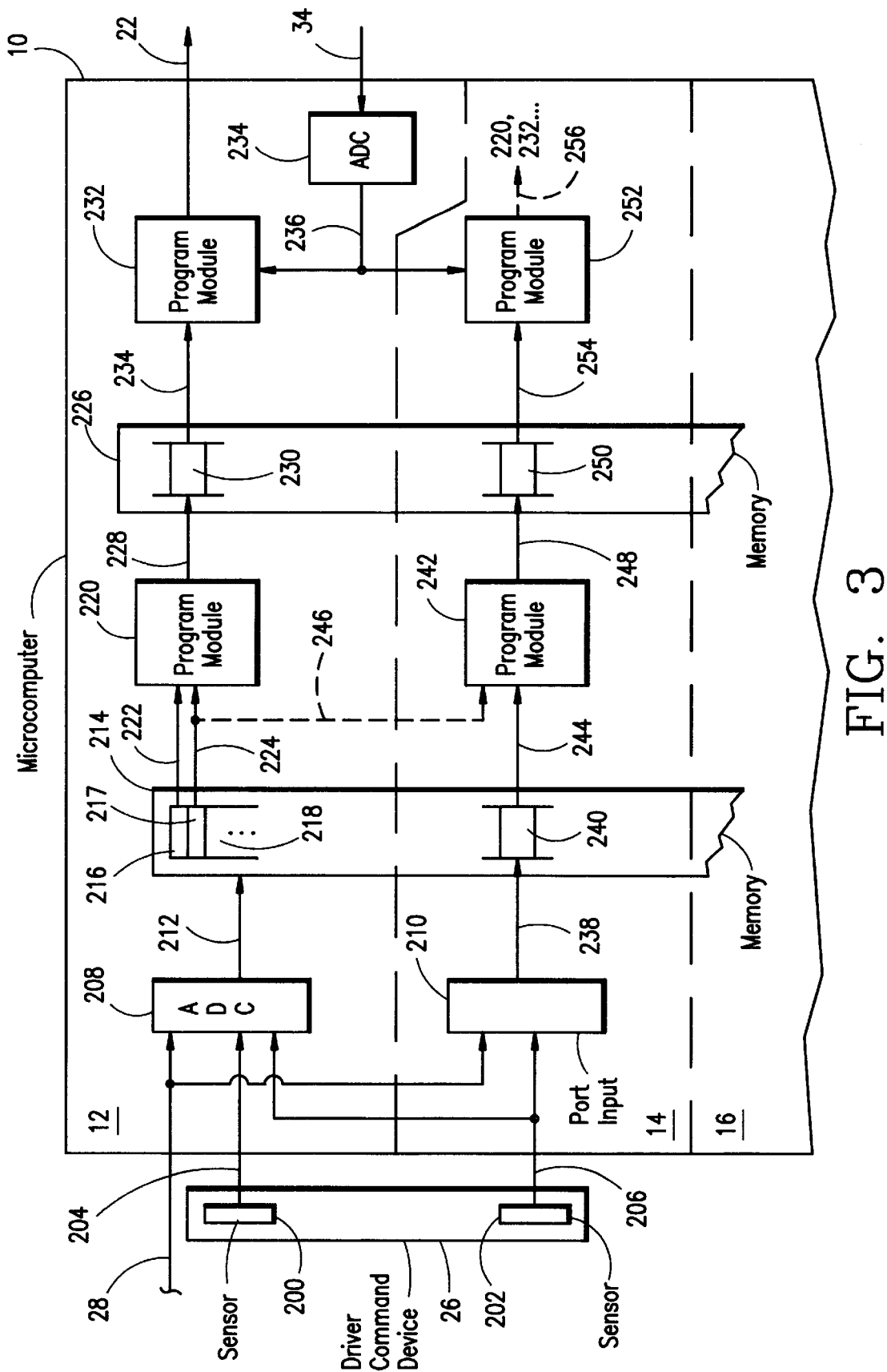
FIG. 3 shows a preferred embodiment of the procedure of the invention.

A preferred embodiment of the first and second levels is shown in the example of a driver command-dependent control of the throttle flap of an internal combustion engine in FIG. 3. The elements already identified in FIGS. 1 and 2 are provided here with the same reference numerals. They are not described in the following in greater detail. In the preferred embodiment, two sensors 200 and 202 are provided in the measuring device 26 to detect the driver command. The sensors 200 and 202 are preferably potentiometers or contactless position transducers having signal lines 204 and 206, respectively, leading to the microcomputer 10. The line 204 of the sensor 200 leads to the function level 12 and there to an analog/digital converter (ADC, 208). The signal line 206 of the second sensor 202 leads, on the one hand, to this converter 208 and, on the other hand, to a port input 210 of the microcomputer 10 which is assigned to the second level 14. In addition, measurement signals are supplied via the communication system 28 to the microcomputer 10. The communication system 28 is connected to the converter 208 as well as to the port inputs 210. The converter 208 of the function level 12 is connected via a line 212 to a part 214 of the memory component of the microcomputer 10. The line 212 is part of the internal bus system of the microcomputer 10. Memory cells (216, 217, 218) are shown symbolically in the portion 214. From the memory cells (216, 217, 218) and others, the program module 220 reads the values, which are stored by the converter 208 or by software (not shown). This is sketched symbolically by the lines 222 and 224. The results of the computations are stored by the program module 220 in a further part 226 of the memory component. This function is symbolized in FIG. 3 by the line 228 and the memory cell 230. A further program module 232 of the function level 12 operates on the basis of the values stored and computed by the program module 220. This is symbolized by the line 234 connecting the memory cell 230 and the program module 232. The value computed by program module 232 is outputted by microcomputer 10 via the line 22. The line 34 is connected to the microcomputer 10 on which a measured value, which represents the position of the throttle flap, is supplied. This line is connected to a further analog/digital converter 234 (or, preferably, to the converter 208). The output line 236 of the converter 234 is connected, as required, via a further part of the memory to program module 232.

The port inputs 210 of the microcomputer 10 are assigned to the monitoring level 14. The communication system 28 as well as the line 206 from sensor 202 are connected to these port inputs 210. These values are stored in the memory part 214 which is shown in FIG. 3 symbolically by the line 238 and the memory element 240. A program module 232 reads out the values read in via the port inputs 210 and stored in the memory part 214 of the monitoring level 14. This is represented by the line 244. Furthermore, and in a preferred embodiment, the program module 214 can evaluate read-in and stored values of the function level 12. This is represented by the broken connecting line 246. The computation results of the program module 242 are stored in the memory part 226 in the region assigned to the monitoring level 14. This is symbolized by the line 248 and the memory element 250. A further program module 252 evaluates the computation results stored in the memory. This is symbolized by the line 254. The line 236 is part of the internal bus system of the microcomputer 10. The line 236 is connected to the program module 252 (if required, via a memory part assigned to the level 14). The output line of the program module 252 is the line 256 (represented by a broken line). The line 256 operates, in dependence upon the embodiment, on the program module 220, the program module 232 or program parts (not shown) for computing the ignition angle or fuel metering. Furthermore, the level 16 is sketched in FIG. 3 and the preferred embodiment thereof has been described above.

Only the most essential elements of the preferred embodiment have been shown in FIG. 3. For reasons of clarity, program modules which are technically necessary for processing and storing the measured values have not been shown. In FIG. 3, only the elements are shown which are necessary for the function and monitoring of the electric control of the throttle flap.

The measuring device 26, that is, the sensors 200 and 202, detect the position of an operator-controlled element actuated by the driver. In the preferred embodiment, this operator-controlled element is the accelerator pedal. The measurement values are supplied to the microcomputer 10. The measurement signals of both sensors are supplied to the converter 208 in the function level 12. The converter 208 converts the analog voltages into digital values which are stored in memory cells of the memory of the microcomputer 10. As in FIG. 3, the digital measurement signal of the sensor 200 is symbolically assigned to the memory cell 216 and the measurement value of the sensor 202 is symbolically assigned to the memory cell 217. In a corresponding manner, the measurement values, which are transmitted via the communication line 28, are converted by the analog/digital converter 208 and are stored in the memory component. The program module 220 reads in the stored measurement values when called up. The throttle flap position desired value is formed in this program module in a known manner. For this purpose, a comparison of these measured values is carried out on the basis of the two read-in measurement values in order to determine deviations between the measured values of the two sensors. If no deviation is detected, the throttle flap position desired value is read out from a characteristic line on the basis of the measurement value of the sensor 200, on the basis of a mean value and/or on the basis of the smallest measured value. Other operating variables such as engine rpm, gear position, et cetera, can be considered which were supplied via the line 28. The computation result, the throttle flap desired value, is stored (cell 230). In addition to the computation of the throttle flap desired value, the evaluation of additional driver inputs takes place in the program module 220 such as the signal of an operator-controlled lever of a road speed controller or interventions of other control apparatus on the throttle flap control such as a drive slip control, an engine drag torque control or a transmission control during shifting operations. Furthermore, a limiting of the desired value is carried out in emergency operation. The throttle flap desired value is determined by minimum value selection. This value is read out from the program module 232, which defines a digital position controller for the throttle flap, and is set into relationship with the throttle flap position actual value supplied via the line 236 and is converted into a drive signal for the throttle flap by means of a pregiven control strategy, for example, PID. This drive signal is outputted via the line 22 and the throttle flap is adjusted in the sense of a matching between desired and actual values.

If deviations in the sensor signals of the accelerator pedal position are detected, then a fault condition can be assumed and the desired value is limited.

In the monitoring level, the measurement signal of the sensor 202 is supplied to the port inputs 210 of the microcomputer. A switching signal is derived from the measurement signal of the sensor 202, for example, via a comparator. The switching signal changes its voltage level in the region of the released accelerator pedal. This read-in signal is stored and is evaluated by program part 242. Correspondingly, two-value data with respect to the status of the additional interventions on the throttle flap and/or with respect to the road speed controller are read in via the inputs 210 and stored. These too are evaluated by program part 242. In a preferred embodiment, a measurement value from the function level is read in for the accelerator pedal position. This measurement value can, for example, be the measurement value determined from the measurement signal of the sensor 202. A comparison between the two determined measurement values can detect fault conditions or, in the case that the measurement value signal of the sensor 200 is evaluated, the availability of the system can be ensured in the event of a fault of sensor 202. The program part 242 forms a comparison value for the accelerator pedal position, which is stored, by a comparison of the read-in data.

This comparison value is a measure as to whether the driver inputs an idle command and is set into relationship by program part 252 with the data as to the position of the throttle flap. For an idle command, the throttle flap cannot be opened above a predetermined limit value. If this is the case, a fault is detected and: via the line 256, the desired value for the throttle flap is limited; the output stage for the throttle flap position is switched off and/or the metering of fuel is at least partially interrupted, et cetera. The monitoring is interrupted if functions are active which are independent of driver command.

In summary, it can be stated that, for the procedure according to the invention, the computation of the control functions as well as their monitoring are carried out in only a single microcomputer. As described above, an active watchdog is provided which checks the operation of the monitoring measures by means of a query/reply interplay. Furthermore, at least two levels (a function level and a monitoring level) are provided which are executed in the microcomputer 10 separately from each other and which do not influence each other outside of the fault situation. The data evaluated by the two levels are supplied to the microcomputer via two different paths independently of each other and evaluated internally by different subprograms independently of each other. In this way, two channels arise in the microcomputer with their mutual independence corresponding to the use of two computing elements.

In addition to the embodiments illustrated, a multiplicity of modifications of the procedure of the invention is possible. For example, and in an advantageous embodiment, two sensors can be provided in lieu of one throttle flap position sensor. These two sensors both read in and both are supplied to the program part 252. Furthermore, a monitoring of the adjustment of the throttle flap by monitoring the control current for the motor or the output signal of the controller is provided which, in the case of a fault, exceeds a maximum value. These monitoring measures too are known.

The procedure of the invention can also be applied to systems which adjust the throttle flap in special operating states. Such an example is the road speed controller. For this purpose, the road speed controller function and the control of the throttle flap are undertaken in the context of the function level 12; whereas, the road speed controller is monitored in the monitoring level 14. For this purpose, the brake signal, the off-switch, the road speed threshold, et cetera, are processed via the monitoring level 14; whereas, the road speed control loops and the position control loops are computed in the context of the function level.

Furthermore, the procedure of the invention can be applied to all the control systems for the drive unit of a motor vehicle wherein a statement as to malfunctions can be made by means of a comparison of the input and output signals for controlling the power of the drive unit.

Also, in an advantageous embodiment, the inclusion of the measuring signal of the sensor 202 in the function level 12 can be omitted.

A further analog/digital converter can be provided in lieu of the port inputs 210 for reading in continuous signals and thereby monitoring can be refined.

Levels are understood to be elements of an organization structure in the computing element which can be configured of different hardware and software elements and can be independent of each other in that at least two mutually independent processing channels arise in the computing element.

We claim:

1. A method for controlling the drive unit of a vehicle having a computing element for controlling the power of said drive unit and for monitoring the control of said power and the vehicle further having a watchdog connected to said computing element, said computing element having at least three program levels which do not influence each other at least not during a malfunction, the method comprising the steps of:

forming, in a firs t one of said levels, at least one control variable for controlling the power of said drive unit at least in one operating state of said vehicle;

checking, in a second one of said levels, the correct formation of said at least one control variable in said first level based on selected quantities;

said watchdog outputting a signal to said computing element and receiving a reply signal from said computing element and initiating a fault reaction when said reply signal does not correspond to what is expected; and, checking, in a third one of said levels, in interplay with said watchdog, the correct carrying out of the monitoring in said second level.

2. The method of claim 1, wherein said first level is adapted to at least electrically control a throttle flap in dependence upon input values.

3. The method of claim 1, wherein said second level monitors the control function to control a throttle flap by comparing input values and adjusted values of the power or values derived from said adjusted values.

4. The method of claim 1, wherein said computing element is a microcomputer; and, wherein the quantities, which are to be evaluated, of the first level and of the second level are supplied via mutually separate inputs of said microcomputer and are evaluated separately from each other within said microcomputer.

5. The method of claim 1, wherein said watchdog poses a pregiven query via a pulse signal having randomly selected pulsewidths; pregiven program modules or program parts are selected based on said pulse signal; at least two counters are changed differently at the start and when leaving the selected program modules or program parts; at the end of the check, outputting a pulse signal based on the counter readings and having pulsewidths derived from said counter readings; and, said watchdog determining malfunctions based on said pulsewidths by comparing this reply to the query of said watchdog.

6. The method of claim 1, wherein said computing element is a microcomputer; and, wherein the driver command is detected by at least two position sensors and the output thereof is supplied to said microcomputer; the output of the sensor, which is to be evaluated for the function of the throttle flap control in dependence on said driver command, is supplied only to said first level; whereas, the output of the sensor, which serves the monitoring, is supplied at least to said second level.

7. The method of claim 1, wherein the supplied data in the function level and in the safety level are evaluated by mutually independent programs or program modules.

8. An arrangement for controlling a drive unit of a vehicle, the arrangement comprising:

a computing element for controlling the power of said drive unit and for monitoring the control of said power;

said computing element having at least three program levels which do not influence each other at least not during a malfunction;

a first one of said levels functioning to form at least one control variable for controlling the power of said drive unit at least in one operating state of said vehicle;

a second one of said levels functioning to check the correct formation of said at least one control variable in said first level based on selected quantities;

a watchdog connected to said computing element and outputting a signal to said computing element and receiving a query signal from said computing element;

means for initiating a fault reaction when the reply signal does not correspond to what is expected; and, a third one of said levels functioning to check, in interplay with said watchdog, the correct carrying out of the monitoring in said second level.

* * * * *